US008165528B2

(12) United States Patent
Raghothaman et al.

(10) Patent No.: US 8,165,528 B2
(45) Date of Patent: Apr. 24, 2012

(54) INTERFERENCE MITIGATION IN WIRELESS NETWORKS

(75) Inventors: Balaji Raghothaman, Hollis, NH (US); Pierre A. Humblet, Cambridge, MA (US)

(73) Assignee: Airvana, Corp., Chelmsford, MA (US)

( * ) Notice: Subject to any disclaimer, the term of this patent is extended or adjusted under 35 U.S.C. 154(b) by 1122 days.

(21) Appl. No.: 11/965,070

(22) Filed: Dec. 27, 2007

(65) Prior Publication Data

US 2009/0170547 A1    Jul. 2, 2009

(51) Int. Cl.
*H04B 1/00* (2006.01)
(52) U.S. Cl. .... 455/63.1; 455/423; 455/436; 455/452.2; 455/522; 370/230; 370/329; 370/503
(58) Field of Classification Search .......... 455/423, 455/63.1, 452.2, 453, 522; 370/329, 503
See application file for complete search history.

(56) References Cited

U.S. PATENT DOCUMENTS

| | | | |
|---|---|---|---|
| 4,031,469 A | 6/1977 | Johnson | |
| 4,072,900 A | 2/1978 | Ray | |
| 5,631,604 A | 5/1997 | Dent et al. | |
| 5,828,677 A | 10/1998 | Sayeed et al. | |
| 5,842,140 A | 11/1998 | Dent et al. | |
| 5,857,147 A | 1/1999 | Gardner et al. | |
| 5,873,028 A | 2/1999 | Nakano et al. | |
| 5,878,350 A | 3/1999 | Nakamura et al. | |
| 5,884,187 A | 3/1999 | Ziv et al. | |
| 5,923,650 A | 7/1999 | Chen et al. | |
| 5,982,760 A | 11/1999 | Chen | |
| 6,085,108 A | 7/2000 | Knutsson et al. | |
| 6,226,525 B1 | 5/2001 | Boch et al. | |
| 6,259,927 B1 | 7/2001 | Butovitsch et al. | |
| 6,507,744 B1 | 1/2003 | Han et al. | |
| 6,567,420 B1 | 5/2003 | Tiedemann, Jr. et al. | |
| 6,584,087 B1 | 6/2003 | Czaja et al. | |
| 6,633,552 B1 | 10/2003 | Ling et al. | |
| 6,697,378 B1 | 2/2004 | Patel | |
| 6,711,144 B1 | 3/2004 | Kim et al. | |
| 6,731,618 B1 | 5/2004 | Chung et al. | |
| 6,741,862 B2 | 5/2004 | Chung et al. | |
| 6,775,548 B1 * | 8/2004 | Rong et al. ............... | 455/452.2 |
| 6,781,999 B2 | 8/2004 | Eyuboglu et al. | |
| 6,823,193 B1 | 11/2004 | Persson et al. | |
| 6,965,564 B2 | 11/2005 | Coffman | |
| 6,983,153 B2 | 1/2006 | Jain et al. | |
| 6,983,333 B2 | 1/2006 | Haberland | |
| 6,999,425 B2 | 2/2006 | Cheng et al. | |
| 7,016,686 B2 | 3/2006 | Spaling et al. | |
| 7,031,141 B2 | 4/2006 | Kuriyama | |
| 7,082,317 B2 | 7/2006 | Yano et al. | |
| 7,085,570 B2 | 8/2006 | Tigerstedt et al. | |

(Continued)

OTHER PUBLICATIONS

USPTO Non-Final Office Action in U.S. Appl. No. 12/731,841, dated Aug. 4, 2010, 12 pages.

(Continued)

*Primary Examiner* — Dwayne Bost
*Assistant Examiner* — Inder Mehra
(74) *Attorney, Agent, or Firm* — Fish & Richardson P.C.

(57) ABSTRACT

An access terminal is enabled to communicate with a private access point while interference caused by the access terminal is mitigated. A maximum allowable transmit rate of the access terminal for communication with the private access point is determined. The access terminal is caused to communicate at a transmit rate at or below the maximum allowable transmit rate.

48 Claims, 3 Drawing Sheets

U.S. PATENT DOCUMENTS

| | | | |
|---|---|---|---|
| 7,120,134 | B2 | 10/2006 | Tiedemann et al. |
| 7,120,447 | B1 | 10/2006 | Chheda et al. |
| 7,136,353 | B2 | 11/2006 | Ha et al. |
| 7,136,666 | B2 | 11/2006 | Charriere et al. |
| 7,142,548 | B2 | 11/2006 | Fong et al. |
| 7,170,871 | B2 | 1/2007 | Eyuboglu et al. |
| 7,194,010 | B2 * | 3/2007 | Beasley et al. ............... 370/503 |
| 7,200,391 | B2 | 4/2007 | Chung et al. |
| 7,206,291 | B2 | 4/2007 | Soldani et al. |
| 7,242,958 | B2 | 7/2007 | Chung et al. |
| 7,248,875 | B2 | 7/2007 | Schreuder et al. |
| 7,248,889 | B2 | 7/2007 | Schwarz et al. |
| 7,268,674 | B2 | 9/2007 | Bohler et al. |
| 7,277,446 | B1 | 10/2007 | Abi-Nassif et al. |
| 7,299,278 | B2 | 11/2007 | Ch'ng |
| 7,305,241 | B2 | 12/2007 | Hirvonen et al. |
| 7,466,669 | B2 | 12/2008 | Hosein |
| 7,574,230 | B1 | 8/2009 | Oh et al. |
| 7,689,173 | B2 | 3/2010 | Ihm et al. |
| 7,729,243 | B2 | 6/2010 | Ananthaiyer et al. |
| 7,831,257 | B2 | 11/2010 | Pollman et al. |
| 7,843,892 | B2 | 11/2010 | Mehrabanzad et al. |
| 7,983,708 | B2 | 7/2011 | Mehrabanzad et al. |
| 2001/0040880 | A1 | 11/2001 | Chen et al. |
| 2002/0021687 | A1 | 2/2002 | Toki et al. |
| 2002/0111183 | A1 | 8/2002 | Lundby |
| 2002/0186657 | A1 | 12/2002 | Jain et al. |
| 2002/0191567 | A1 | 12/2002 | Famolari et al. |
| 2002/0193118 | A1 | 12/2002 | Jain et al. |
| 2002/0196749 | A1 | 12/2002 | Eyuboglu et al. |
| 2003/0002507 | A1 | 1/2003 | Hans et al. |
| 2003/0072294 | A1 | 4/2003 | Wei et al. |
| 2003/0083092 | A1 | 5/2003 | Kim et al. |
| 2003/0083093 | A1 | 5/2003 | Yun et al. |
| 2003/0092463 | A1 | 5/2003 | Charriere et al. |
| 2003/0100311 | A1 | 5/2003 | Chung et al. |
| 2003/0125068 | A1 | 7/2003 | Lee et al. |
| 2004/0038697 | A1 | 2/2004 | Attar et al. |
| 2004/0047305 | A1 | 3/2004 | Ulupinar |
| 2004/0109424 | A1 | 6/2004 | Chheda |
| 2004/0110534 | A1 | 6/2004 | Chung et al. |
| 2004/0158790 | A1 | 8/2004 | Gaal et al. |
| 2004/0179494 | A1 | 9/2004 | Attar et al. |
| 2004/0179525 | A1 | 9/2004 | Balasubramanian et al. |
| 2004/0185868 | A1 | 9/2004 | Jain et al. |
| 2004/0213182 | A1 | 10/2004 | Huh et al. |
| 2004/0228286 | A1 | 11/2004 | Kim et al. |
| 2004/0229604 | A1 | 11/2004 | Fong et al. |
| 2005/0032540 | A1 | 2/2005 | Lee et al. |
| 2005/0047365 | A1 | 3/2005 | Hong et al. |
| 2005/0047375 | A1 | 3/2005 | Kwon et al. |
| 2005/0107090 | A1 | 5/2005 | Hosein |
| 2005/0107091 | A1 | 5/2005 | Vannithamby et al. |
| 2005/0124369 | A1 | 6/2005 | Attar et al. |
| 2005/0141454 | A1 | 6/2005 | Jain et al. |
| 2005/0169301 | A1 | 8/2005 | Jain et al. |
| 2005/0192042 | A1 | 9/2005 | Au et al. |
| 2005/0213555 | A1 | 9/2005 | Eyuboglu et al. |
| 2005/0243749 | A1 | 11/2005 | Mehrabanzad et al. |
| 2005/0245279 | A1 | 11/2005 | Mehrabanzad et al. |
| 2005/0250511 | A1 | 11/2005 | Xiao et al. |
| 2006/0067422 | A1 | 3/2006 | Chung |
| 2006/0067451 | A1 | 3/2006 | Pollman et al. |
| 2006/0126509 | A1 | 6/2006 | Abi-Nassif |
| 2006/0135173 | A1 | 6/2006 | Vannithamby |
| 2006/0135189 | A1 | 6/2006 | Nagaraj et al. |
| 2006/0159045 | A1 | 7/2006 | Ananthaiyer et al. |
| 2006/0176187 | A1 | 8/2006 | Bohler et al. |
| 2006/0215608 | A1 | 9/2006 | Lee et al. |
| 2006/0240782 | A1 | 10/2006 | Pollman et al. |
| 2006/0291420 | A1 | 12/2006 | Ng |
| 2006/0294241 | A1 | 12/2006 | Cherian et al. |
| 2007/0026884 | A1 | 2/2007 | Rao |
| 2007/0058628 | A1 | 3/2007 | Rao et al. |
| 2007/0077948 | A1 | 4/2007 | Sharma et al. |
| 2007/0081509 | A1 | 4/2007 | Ihm et al. |
| 2007/0097916 | A1 | 5/2007 | Eyuboglu et al. |
| 2007/0101015 | A1 | 5/2007 | Larsson et al. |
| 2007/0115896 | A1 | 5/2007 | To et al. |
| 2007/0140172 | A1 | 6/2007 | Garg et al. |
| 2007/0140184 | A1 | 6/2007 | Garg et al. |
| 2007/0140185 | A1 | 6/2007 | Garg et al. |
| 2007/0140218 | A1 | 6/2007 | Nair et al. |
| 2007/0155329 | A1 | 7/2007 | Mehrabanzad et al. |
| 2007/0202826 | A1 | 8/2007 | Dean |
| 2007/0220573 | A1 | 9/2007 | Chiussi et al. |
| 2007/0230419 | A1 | 10/2007 | Raman et al. |
| 2007/0238442 | A1 | 10/2007 | Mate et al. |
| 2007/0238476 | A1 | 10/2007 | Raman et al. |
| 2007/0242648 | A1 | 10/2007 | Garg et al. |
| 2007/0248035 | A1 | 10/2007 | Sang et al. |
| 2007/0248042 | A1 | 10/2007 | Harikumar et al. |
| 2008/0003988 | A1 | 1/2008 | Richardson |
| 2008/0013488 | A1 | 1/2008 | Garg et al. |
| 2008/0062925 | A1 | 3/2008 | Mate et al. |
| 2008/0065752 | A1 | 3/2008 | Ch'ng et al. |
| 2008/0069020 | A1 | 3/2008 | Richardson |
| 2008/0069028 | A1 | 3/2008 | Richardson |
| 2008/0076398 | A1 | 3/2008 | Mate et al. |
| 2008/0117842 | A1 | 5/2008 | Rao |
| 2008/0119172 | A1 | 5/2008 | Rao et al. |
| 2008/0120417 | A1 | 5/2008 | Harikumar et al. |
| 2008/0139203 | A1 | 6/2008 | Ng et al. |
| 2008/0146154 | A1 * | 6/2008 | Claussen et al. ............. 455/63.1 |
| 2008/0146232 | A1 | 6/2008 | Knisely |
| 2008/0151843 | A1 | 6/2008 | Valmikam et al. |
| 2008/0159236 | A1 | 7/2008 | Ch'ng et al. |
| 2008/0162924 | A1 | 7/2008 | Chinitz et al. |
| 2008/0162926 | A1 | 7/2008 | Xiong et al. |
| 2008/0253550 | A1 | 10/2008 | Ch'ng et al. |
| 2008/0254792 | A1 | 10/2008 | Ch'ng |
| 2009/0034440 | A1 | 2/2009 | Samar et al. |
| 2009/0088146 | A1 | 4/2009 | Wigren et al. |
| 2009/0124250 | A1 * | 5/2009 | Topaltzas et al. ............. 455/423 |
| 2009/0170547 | A1 | 7/2009 | Raghothaman et al. |
| 2010/0177731 | A1 | 7/2010 | Ananthaiyer et al. |
| 2010/0254338 | A1 * | 10/2010 | Tanaka ......................... 370/329 |

OTHER PUBLICATIONS

USPTO Non-Final Office Action in U.S. Appl. No. 10/835,546, dated Dec. 7, 2010, 28 pages.

Fish & Richardson P.C., Response to Action dated Sep. 2, 2010 in U.S. Appl. No. 11/191,528, filed Dec. 29, 2010, 18 pages.

U.S. Appl. No. 12/955,610, filed Nov. 29, 2010, including application as filed, (PTO website), and pending claims.

Fish & Richardson P.C., Response to Action dated Aug. 4, 2010 in U.S. Appl. No. 12/731,841, filed Jan. 4, 2011, 9 pages.

Office Action and response history as of Jan. 6, 2010 in U.S. Appl. No. 11/037,515.

Office Action and response history as of Dec. 23, 2009 in U.S. Appl. No. 10/835,546.

Office Action and response history as of Jan. 13, 2010 in U.S. Appl. No. 10/835,537.

U.S. Appl. No. 10/835,546, filed Apr. 28, 2004, including application as filed, (PTO Website), and pending claims.

U.S. Appl. No. 10/835,537, filed Apr. 28, 2004, including application as filed, (PTO Website), and pending claims.

U.S. Appl. No. 11/037,515, filed Jan. 18, 2005, including application as filed, (PTO website), and pending claims.

U.S. Appl. No. 11/114,422, filed Apr. 26, 2005, including application as filed, (PTO website), and pending claims.

U.S. Appl. No. 11/191,528, filed Jul. 28, 2005, including application as filed, (PTO website), and pending claims.

3rd Generation Partnership Project "3GPP2", CDMA 2000 High Rate Packet Data Air Interface Specification, C.S0024-A, version 4.0, Oct. 25, 2002.

3rd Generation Partnership Project "3GPP2", CDMA 2000 High Rate Packet Data Air Interface Specification, C.S0024-A, version 1.0, Mar. 2004.

3rd Generation Partnership Project "3GPP2", CDMA2000 High Rate Packet Data Interface Specification, TIA/EIA/IS-856A, C.S0024-A, Version 2, Jul. 2005 (1227 pages).

3rd Generation Partnership Project "3GPP2", CDMA2000 High Rate Packet Data Interface Specification, TIA/EIA/IS-856B, C.S0024-B, Version 1, Apr. 2006 (1623 pages).

3rd Generation Partnership Project "3GPP2", CDMA2000 High Rate Packet Data Interface Specification, TIA/EIA/IS-856B, C.S0024-B, Version 2, Mar. 2007 (1627 pages).

Base Transceiver Station that Connects Mobile Phones to the Public Network, System Applications; Backbone Communications; Base Transceiver Stations (Mobile Telephony), NEC Electronics, Jun. 3, 2005, pp. 1-4, http://necel.com/en/solutions/applications/bs/bs.html.

Charkravarth, S., "Algorithm for Reverse Traffic Rate Control for cdma2000 High Rate Packet Data Systems", GLOBECOM2001, San Antonion, Texas, Nov. 2001 (pp. 3733-3737).

3rd Generation Partnership Project "3GPP2", "TSG-C WG3, 1xEV-DO, Evaluation Methodology", 3GPP2 TSG-C Contribution C30-20031002-004, Oct. 2004 (194 pages).

Attar, Rashid A. and Eduardo Esteves, "A Reverse Link Outer-Loop Power Control Algorithm for CDMA2000 1xEV Systems", Proceedings of ICC, Apr. 2002.

Office Action and response history as of Feb. 23, 2009 in U.S. Appl. No. 10/835,546.

Office Action and response history as of Feb. 12, 2009 in U.S. Appl. No. 10/835,537.

Office Action and response history as of Feb. 23, 2009 in U.S. Appl. No. 11/037,515.

Office Action and response history as of Feb. 12, 2009 in U.S. Appl. No. 11/114,422.

Office Action and response history as of Feb. 23, 2009 in U.S. Appl. No. 11/191,528.

USPTO Final Office Action in U.S. Appl. No. 11/191,528, dated Jan. 21, 2011, 65 pages.

Fish & Richardson P.C., Response to Action dated Dec. 7, 2010 in U.S. Appl. No. 10/835,546, filed Mar. 7, 2011, 17 pages.

USPTO Final Office Action in U.S. Appl. No. 12/731,841, dated Mar. 21, 2011, 13 pages.

Fish & Richardson P.C., Response to Action dated Jan. 21, 2011 in U.S. Appl. No. 11/191,528, filed Apr. 21, 2011, 16 pages.

Office Action and response history as of Apr. 29, 2009 in U.S. Appl. No. 11/114,422.

USPTO Notice of Allowance in U.S. Appl. No. 10/835,546, dated May 26, 2011, 15 pages.

Office action from U.S. Appl. No. 11/037,515 mailed Jun. 15, 2009.

Advisory action mailed Jul. 16, 2009 and request for continued examination filed Jul. 21, 2009 from U.S. Appl. No. 11/114,422.

Advisory action mailed Jun. 2, 2009 and request for continued examination filed Jul. 21, 2009 from U.S. Appl. No. 10/835,546.

U.S. Appl. No. 12/731,841, filed Mar. 25, 2010, including application as filed, (PTO website), and pending claims.

Office Action and response history as of Mar. 4, 2010 in U.S. Appl. No. 11/114,422.

Office Action and response history as of Mar. 25, 2010 in U.S. Appl. No. 10/835,546.

Fish & Richardson P.C., Amendment in Reply to Action dated Oct. 14, 2009 in U.S. Appl. No. 11/191,528, filed Jul. 6, 2010, 15 pages.

Fish & Richardson P.C., Amendment in Reply to Action dated Mar. 18, 2010 in U.S. Appl. No. 10/835,537, filed Jul. 19, 2010, 15 pages.

Office Action and response history as of Aug. 9, 2009 in U.S. Appl. No. 11/114,422.

Office Action and response history as of Aug. 9, 2009 in U.S. Appl. No. 11/191,528.

USPTO Non-Final Office Action in U.S. Appl. No. 11/191,528, dated Sep. 2, 2010, 58 pages.

Fish & Richardson P.C., Appeal Brief in Reply to Action dated Mar. 25, 2010 in U.S. Appl. No. 10/835,546, filed Jul. 26, 2010, 5 pages.

Office Action and response history as of Sep. 24, 2009 in U.S. Appl. No. 11/037,515.

Office Action and response history as of Sep. 24, 2009 in U.S. Appl. No. 10/835,546.

USPTO Notice of Allowance in U.S. Appl. No. 10/835,537, dated Oct. 1, 2010, 11 pages.

Office Action and response history as of Oct. 14, 2009 in U.S. Appl. No. 10/835,537.

Office Action and response history as of Oct. 14, 2009 in U.S. Appl. No. 11/191,528.

Office Action and response history as of Dec. 9, 2009 in U.S. Appl. No. 11/114,422.

Non Final Office Action in U.S. Appl. No. 12/955,610, dated Jul. 1, 2011, 16 pages.

Fish & Richardson P.C., Response to Action dated Jul. 1, 2011 in U.S. Appl. No. 12/955,610, filed Nov. 7, 2011, 12 pages.

Final Office Action in U.S. Appl. No. 12/955,610, dated Nov. 21, 2011, 14 pages.

USPTO Notice of Allowance in U.S. Appl. No. 11/191,528, dated Oct. 18, 2011, 11 pages.

* cited by examiner

INTERFERENCE MITIGATION IN WIRELESS NETWORKS

BACKGROUND

This disclosure relates to interference mitigation in wireless networks.

When connecting to a radio network, an access terminal selects an access point from available radio network access points that are found to be within communication range. Network protocols are used in communicating between an access point and an access terminal.

The 1xEV-DO protocol has been standardized by the TIA as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, Jul. 2005. Revision A is also incorporated herein by reference. Revision B to this specification has been published as TIA/EIA/IS-8560B, 3GPP2 C.S0024-B, version 1.0, May 2006, and is also incorporated herein by reference. Other wireless communication protocols may also be used.

SUMMARY

In general, in some aspects, a method of enabling an access terminal to communicate with a private access point while mitigating interference caused by the access terminal includes determining a maximum allowable transmit rate of the access terminal for communication with the private access point. The method also includes causing the access terminal to communicate at a transmit rate at or below the maximum allowable transmit rate.

Implementations may include one or more of the following features.

The method may mitigate interference at a second access point. The second access point may include a macro access point. The second access point may include a second private access point. In the method, contributions to interference at the macro access point due to a set of N access terminals configured to communicate with a set of private access points may be constrained by a maximum interference limit for the macro access point. The set of N access terminals may include the access terminal. The set of private access points may include the private access point.

In the method, determining the maximum allowable transmit rate may include satisfying a constraint based on the maximum interference limit given by the following inequality:

$$\sum_{i=1}^{N} P_i^{AT} G_i^M \leq \Delta P_{I,max};$$

where $P_i^{AT}$ may be a transmit power of an $i^{th}$ access terminal of the set of N access terminals, $G_i^M$ may be the path gain from the $i^{th}$ access terminal to the macro access point, and $\Delta P_{I,max}$ may be the maximum interference limit. Determining the maximum allowable transmit rate may further include receiving a value $PG_{max,i}$. $PG_{max,i}$ may be an estimate of the maximum interference limit divided by a number N of access terminals of the set of N access terminals. Determining the maximum allowable transmit rate may further include estimating a path gain $G_i^M$ from the $i^{th}$ access terminal to the macro access point, and receiving a maximum allowable transmit power value $P_{max,i}^{AT}$. $P_{max,i}^{AT}$ may be based in part on the path gain $G_i^M$ and the maximum interference limit.

In the method, determining the maximum allowable transmit rate may include determining a first power value. The first power value may be a power received from the access terminal at the macro access point. Determining the maximum allowable transmit rate may also include estimating the maximum allowable transmit rate based in part on the first power value and on the maximum interference limit. Determining the first power value may include receiving a macro access point signal strength value and a private access point signal strength value from the access terminal. Determining the first power value may also include determining a second power value. The second power value may be a second power received from the access terminal at the private access point. Determining the first power value may also include determining the first power value based on the macro access point signal strength value, the private access point signal strength value, a private access point transmit power value, a macro access point transmit power value, and the second power value.

In the method, determining the maximum allowable transmit rate may include receiving an estimated maximum allowable transmit power of the access terminal, and estimating the maximum allowable transmit rate based on the estimated maximum allowable transmit power. Estimating the maximum allowable transmit rate based on the estimated maximum allowable transmit power may include estimating the maximum allowable transmit rate according to the following equation:

$$R_{i,max} = T^{-1}\left(\frac{P_{max,i}^{AT}}{P_{i,pilot}^{AT}}\right);$$

where the access terminal may be an $i^{th}$ access terminal of the set of N access terminals, $R_{i,max}$ may be the maximum allowable transmit rate, $T^{-1}(x)$ may be an inverse of a known mathematical function $T(R)$ of a transmit rate R of the $i^{th}$ access terminal, $P_{max,i}^{AT}$ may be the estimated maximum allowable transmit power, and $P_{i,pilot}^{AT}$ may be a pilot signal power of the $i^{th}$ access terminal. The estimated maximum allowable transmit power may be constant for all access terminals of the set of N access terminals. The method may further include estimating a path gain $G_i^M$ from the $i^{th}$ access terminal to the macro access point, and sending the path gain $G_i^M$ to a programmable server. The programmable server may be configured to manage the set of private access points. The programmable server may be configured to determine the estimated maximum allowable transmit power based in part on the path gain $G_i^M$ and the maximum interference limit for the macro access point. The method may further include estimating a second path gain $G_i^F$ from the $i^{th}$ access terminal to the private access point, and estimating a total power value $\hat{I}_O^{AT}$ indicative of a total power measured by the access terminal. The path gain $G_i^M$ and the second path gain $G_i^F$ may be based in part on the total power value $\hat{I}_O^{AT}$.

In the method, causing the access terminal to communicate at a transmit rate at or below the maximum allowable transmit rate may include setting an attribute on the access terminal to affect a maximum packet size of packets transmitted by the access terminal. The access terminal may communicate according to the EV-DO air interface standard. In the method, causing the access terminal to communicate at a transmit rate at or below the maximum allowable transmit rate may include sending a message to the access terminal. The access terminal may communicate according to the EV-DO air interface standard.

In some aspects, a computer program product is tangibly embodied in one or more information carriers for enabling an access terminal to communicate with a private access point while mitigating interference caused by the access terminal. The computer program product includes instructions that are executable by one or more processing devices to determine a maximum allowable transmit rate of the access terminal for communication with the private access point. The computer program product also include instructions that are executable by the one or more processing devices to cause the access terminal to communicate at a transmit rate at or below the maximum allowable transmit rate.

Implementations may include one or more of the following features.

The computer program product may be for enabling the access terminal to communicate with the private access point while mitigating interference at a second access point. The second access point may include a macro access point. The second access point may include a private access point. In the computer program product, contributions to interference at the macro access point due to a set of N access terminals configured to communicate with a set of private access points may be constrained by a maximum interference limit for the macro access point. The set of N access terminals may include the access terminal. The set of private access points may include the private access point.

In the method, determining the maximum allowable transmit rate may include satisfying a constraint based on the maximum interference limit given by the following inequality:

$$\sum_{i=1}^{N} P_i^{AT} G_i^M \leq \Delta P_{I,max};$$

where $P_i^{AT}$ may be a transmit power of an $i^{th}$ access terminal of the set of N access terminals, $G_i^M$ may be the path gain from the $i^{th}$ access terminal to the macro access point, and $\Delta P_{I,max}$ may be the maximum interference limit. Determining the maximum allowable transmit rate may further include receiving a value $PG_{max,i}$. $PG_{max,i}$ may be an estimate of the maximum interference limit divided by a number N of access terminals of the set of N access terminals. Determining the maximum allowable transmit rate may further include estimating a path gain $G_i^M$ from the $i^{th}$ access terminal to the macro access point, and receiving a maximum allowable transmit power value $P_{max,i}^{AT}$. $P_{max,i}^{AT}$ may be based in part on the path gain $G_i^M$ and the maximum interference limit.

In the computer program product, determining the maximum allowable transmit rate may include determining a first power value. The first power value may be a power received from the access terminal at the macro access point. Determining the maximum allowable transmit rate may also include estimating the maximum allowable transmit rate based in part on the first power value and on the maximum interference limit. Determining the first power value may include receiving a macro access point signal strength value and a private access point signal strength value from the access terminal. Determining the first power value may also include determining a second power value. The second power value may be a second power received from the access terminal at the private access point. Determining the first power value may also include determining the first power value based on the macro access point signal strength value, the private access point signal strength value, a private access point transmit power value, a macro access point transmit power value, and the second power value.

In the computer program product, determining the maximum allowable transmit rate may include receiving an estimated maximum allowable transmit power of the access terminal, and estimating the maximum allowable transmit rate based on the estimated maximum allowable transmit power. Estimating the maximum allowable transmit rate based on the estimated maximum allowable transmit power may include estimating the maximum allowable transmit rate according to the following equation:

$$R_{i,max} = T^{-1}\left(\frac{P_{max,i}^{AT}}{P_{i,pilot}^{AT}}\right);$$

where the access terminal may be an $i^{th}$ access terminal of the set of N access terminals, $R_{i,max}$ may be the maximum allowable transmit rate, $T^{-1}(x)$ may be an inverse of a known mathematical function $T(R)$ of a transmit rate R of the $i^{th}$ access terminal, $P_{max,i}^{AT}$ may be the estimated maximum allowable transmit power, and $P_{i,pilot}^{AT}$ may be a pilot signal power of the $i^{th}$ access terminal. The estimated maximum allowable transmit power may be constant for all access terminals of the set of N access terminals. The computer program product may further include instructions that are executable by the one or more processing devices to estimate a path gain $G_i^M$ from the $i^{th}$ access terminal to the macro access point, and send the path gain $G_i^M$ to a programmable server. The programmable server may be configured to manage the set of private access points. The programmable server may be configured to determine the estimated maximum allowable transmit power based in part on the path gain $G_i^M$ and the maximum interference limit for the macro access point. The computer program product may further include instructions that are executable by the one or more processing devices to estimate a second path gain $G_i^F$ from the $i^{th}$ access terminal to the private access point, and estimate a total power value $\hat{I}_O^{AT}$ indicative of a total power measured by the access terminal. The path gain $G_i^M$ and the second path gain $G_i^F$ may be based in part on the total power value $\hat{I}_O^{AT}$.

In the computer program product, causing the access terminal to communicate at a transmit rate at or below the maximum allowable transmit rate may include setting an attribute on the access terminal to affect a maximum packet size of packets transmitted by the access terminal. The access terminal may communicate according to the EV-DO air interface standard. In the method, causing the access terminal to communicate at a transmit rate at or below the maximum allowable transmit rate may include sending a message to the access terminal. The access terminal may communicate according to the EV-DO air interface standard.

In some aspects, a system includes a private access point configured to enable an access terminal to communicate with the private access point and configured to mitigate interference caused by the access terminal. The private access point includes memory configured to store instructions for execution, and one or more processing devices configured to execute the instructions. The instructions are for causing the one or more processing devices to determine a maximum allowable transmit rate of the access terminal for communication with the private access point. The instructions are also for causing the one or more processing devices to cause the access terminal to communicate at a transmit rate at or below the maximum allowable transmit rate.

Implementations may include one or more of the following features.

In the system, the private access point may be configured to enable the access terminal to communicate with the private access point and configured to mitigate interference at a second access point. The second access point may include a macro access point. The second access point may include a private access point. In the computer program product, contributions to interference at the macro access point due to a set of N access terminals configured to communicate with a set of private access points may be constrained by a maximum interference limit for the macro access point. The set of N access terminals may include the access terminal. The set of private access points may include the private access point.

In the system, determining the maximum allowable transmit rate may include satisfying a constraint based on the maximum interference limit given by the following inequality:

$$\sum_{i=1}^{N} P_i^{AT} G_i^M \leq \Delta P_{I,max};$$

where $P_i^{AT}$ may be a transmit power of an $i^{th}$ access terminal of the set of N access terminals, $G_i^M$ may be the path gain from the $i^{th}$ access terminal to the macro access point, and $\Delta P_{I,max}$ may be the maximum interference limit. Determining the maximum allowable transmit rate may further include receiving a value $PG_{max,i}$. $PG_{max,i}$ may be an estimate of the maximum interference limit divided by a number N of access terminals of the set of N access terminals. Determining the maximum allowable transmit rate may further include estimating a path gain $G_{i,M}$ from the $i^{th}$ access terminal to the macro access point, and receiving a maximum allowable transmit power value $P_{max,i}^{AT}$. $P_{max,i}^{AT}$ may be based in part on the path gain $G_i^M$ and the maximum interference limit.

In the system, determining the maximum allowable transmit rate may include determining a first power value. The first power value may be a power received from the access terminal at the macro access point. Determining the maximum allowable transmit rate may also include estimating the maximum allowable transmit rate based in part on the first power value and on the maximum interference limit. Determining the first power value may include receiving a macro access point signal strength value and a private access point signal strength value from the access terminal. Determining the first power value may also include determining a second power value. The second power value may be a second power received from the access terminal at the private access point. Determining the first power value may also include determining the first power value based on the macro access point signal strength value, the private access point signal strength value, a private access point transmit power value, a macro access point transmit power value, and the second power value.

In the system, determining the maximum allowable transmit rate may include receiving an estimated maximum allowable transmit power of the access terminal, and estimating the maximum allowable transmit rate based on the estimated maximum allowable transmit power. Estimating the maximum allowable transmit rate based on the estimated maximum allowable transmit power may include estimating the maximum allowable transmit rate according to the following equation:

$$R_{i,max} = T^{-1}\left(\frac{P_{max,i}^{AT}}{P_{i,pilot}^{AT}}\right);$$

where the access terminal may be an $i^{th}$ access terminal of the set of N access terminals, $R_{i,max}$ may be the maximum allowable transmit rate, $T^{-1}(x)$ may be an inverse of a known mathematical function $T(R)$ of a transmit rate R of the $i^{th}$ access terminal, $P_{max,i}^{AT}$ may be the estimated maximum allowable transmit power, and $P_{i,pilot}^{AT}$ may be a pilot signal power of the $i^{th}$ access terminal. The estimated maximum allowable transmit power may be constant for all access terminals of the set of N access terminals. The method may further include estimating a path gain $G_i^M$ from the $i^{th}$ access terminal to the macro access point, and sending the path gain $G_i^M$ to a programmable server. The system may further include a programmable server that may be configured to manage the set of private access points. The programmable server may include a second memory configured to store second instructions for execution. The programmable server may also include a second set of one or more processing devices configured to execute the second instructions. The second instruction may be for causing the second set of one or more processing devices to determine the estimated maximum allowable transmit power based in part on the path gain $G_i^M$ and the maximum interference limit for the macro access point. The method may further include estimating a second path gain $G_i^F$ from the $i^{th}$ access terminal to the private access point, and estimating a total power value $\hat{I}_O^{AT}$ indicative of a total power measured by the access terminal. The path gain $G_i^M$ and the second path gain $G_i^F$ may be based in part on the total power value $\hat{I}_O^{AT}$.

In the system, causing the access terminal to communicate at a transmit rate at or below the maximum allowable transmit rate may include setting an attribute on the access terminal to affect a maximum packet size of packets transmitted by the access terminal. The access terminal may communicate according to the EV-DO air interface standard. In the method, causing the access terminal to communicate at a transmit rate at or below the maximum allowable transmit rate may include sending a message to the access terminal. The access terminal may communicate according to the EV-DO air interface standard.

The foregoing methods may be implemented as a computer program product comprised of instructions that are stored on one or more machine-readable media, and that are executable on one or more processing devices. The foregoing methods may be implemented as an apparatus or system that includes one or more processing devices and memory to store executable instructions to implement the methods. A graphical user interface may be generated that is configured to provide a user with access to and at least some control over stored executable instructions to implement the methods.

The details of one or more examples are set forth in the accompanying drawings and the description below. Further features, aspects, and advantages are apparent in the description, the drawings, and the claims.

DETAILED DESCRIPTION

Figure 1:
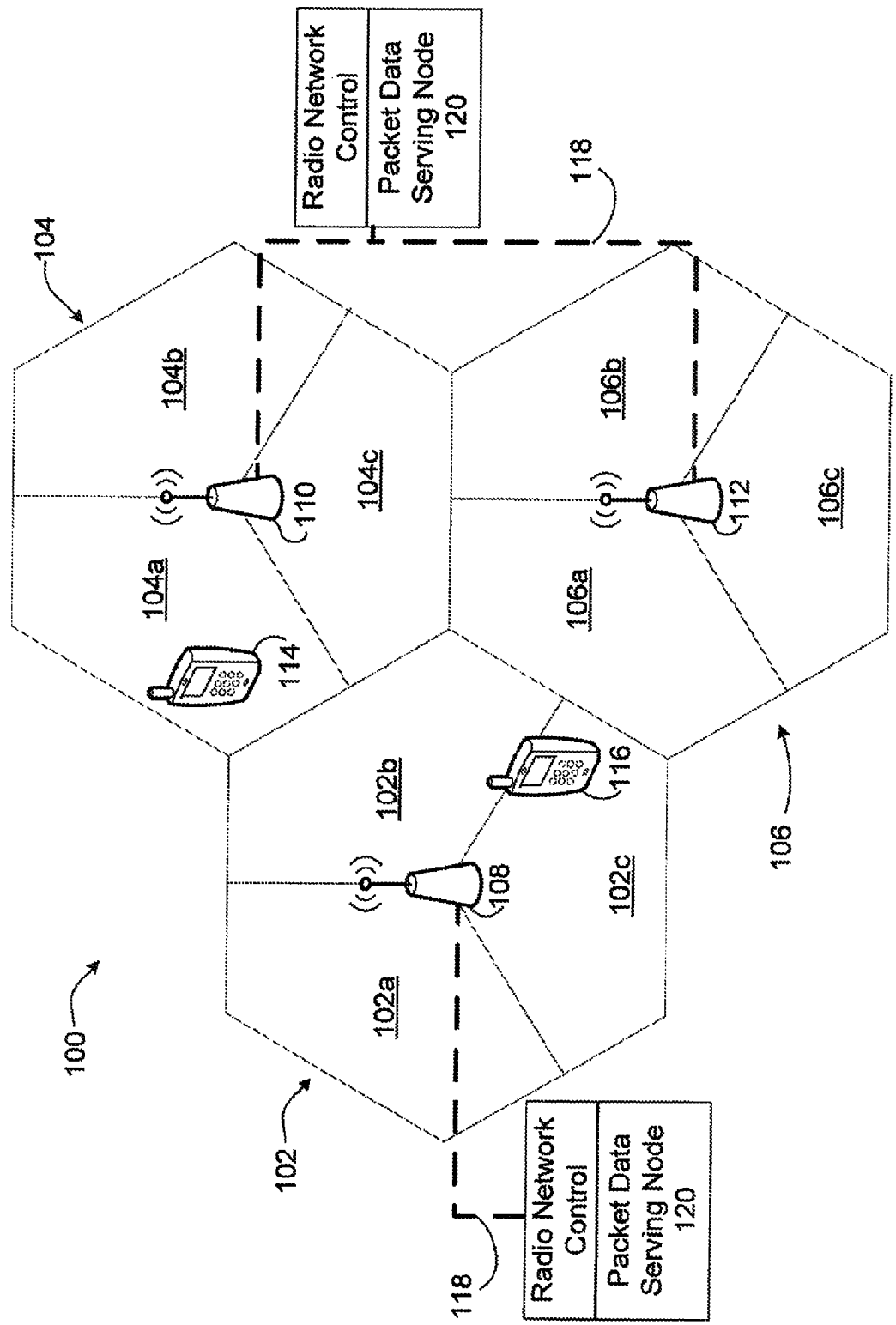
FIG. 1 shows a wireless network.

Cellular wireless communications systems are designed to serve many access terminals distributed in a large geographic area by dividing the area into cells, as shown in FIG. 1. At or near the center of each cell 102, 104, 106, a radio network access point 108, 110, 112, also referred to as a base transceiver station (BTS), is located to serve access terminals 114, 116 (e.g., cellular telephones, laptops, PDAs, also known as mobile stations) located in the cell. Each cell is often further divided into sectors 102a-c, 104a-c, 106a-c by using multiple sectorized antennas. In each cell, that cell's radio network access point may serve one or more sectors and may communicate with multiple access terminals in its cell.

The radio access network (RAN) 100 shown in FIG. 1 uses an EV-DO protocol to transmit voice and data packets between an access terminal, e.g., access terminals 114, 116, and a radio network access point, e.g., access points 108, 110, 112. In the example of FIG. 1, the access points 108, 110, 112 are connected over a backhaul connection 118 to radio network control/packet data serving nodes (RNC/PDSN) 120, which may be one or more physical devices at different locations. Although this description uses terminology from the EV-DO air interface standard in CDMA (Code Division Multiple Access) networks, the same concepts are applicable to other communication methods, including the 1xRTT air interface standard for voice packet transmission, GSM (Global System for Mobile Communications), UMTS (Universal Mobile Telecommunications Service), HSDPA (High Speed Downlink Packet Access), WiMax (Worldwide Interoperability for Microwave Access), WiBro (Wireless Broadband), WiFi, and the like.

Figure 2:
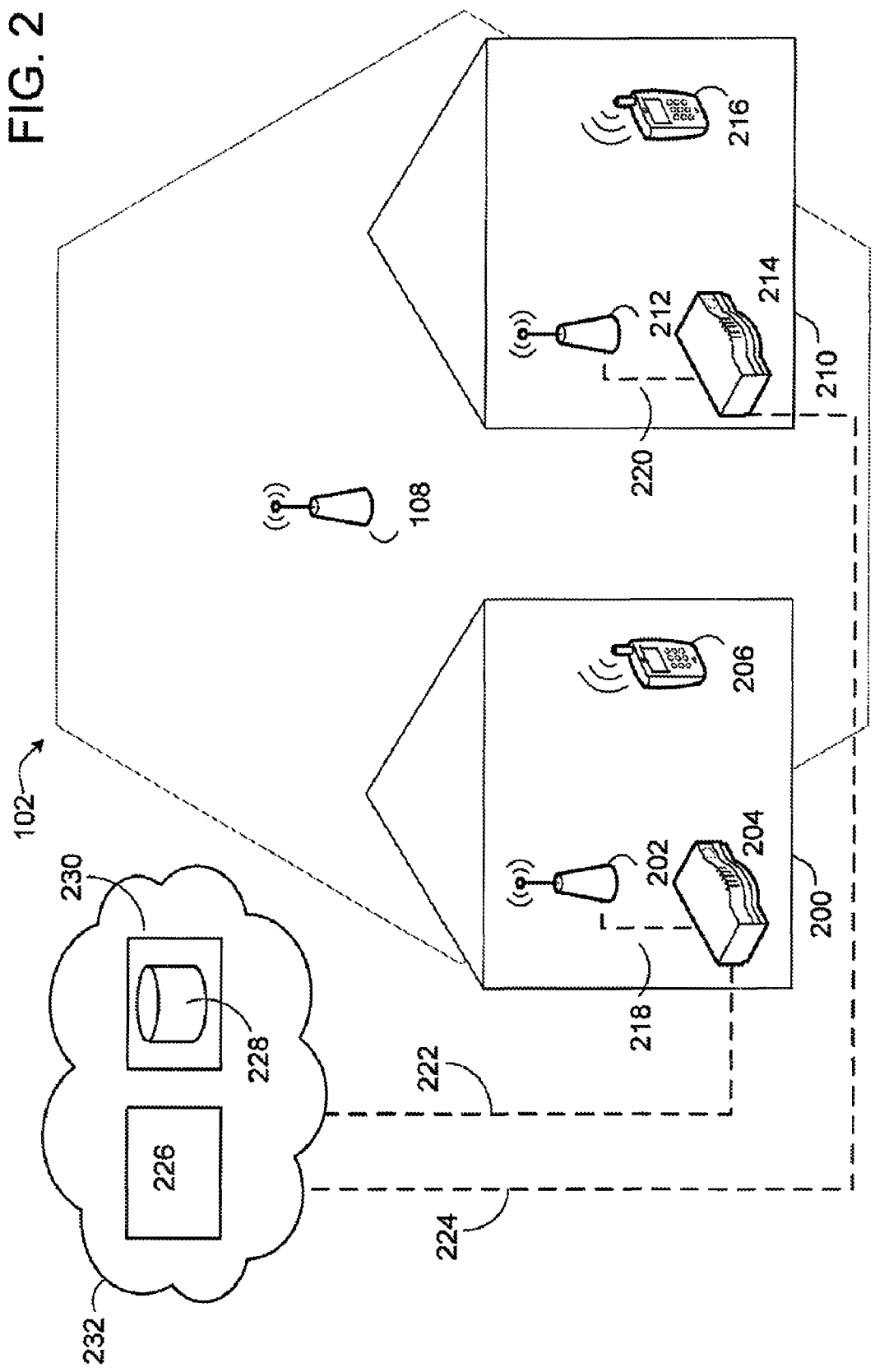
FIG. 2 shows a wireless network with a home networking deployment.

In some examples, as shown in FIG. 2, a radio network access point 202 may be deployed in a user's home 200 in a similar manner as a WiFi® access point. Such a radio network access point is referred to as a private access point. The private access point 202 may use an available high-speed internet connection, such as a digital subscriber line (DSL) or cable modem 204, as the backhaul with the RNC/PDSN functionality implemented in the private access point 202. Such a private access point may be installed anywhere, for example, in an office, a public space, or a restaurant. When this description refers to a private access point being in a "home," that encompasses any such location. Private access points may include, for example, femtocells or picocells. In some examples, a private access point may be integrated into a cable modem or other network hardware, such as a router or WiFi access point.

When an authorized access terminal 206 is present inside the home (or anywhere within range of the private access point 202), it may use the private access point 202 rather than a regular cellular radio network access point, such as access point 108, to place or receive voice calls and data connections, even if the access terminal is otherwise within the cell 102 for that access point 108. We sometimes refer to the standard access point 108 as a macro access point or macro BTS to distinguish it from a private access point, as the standard access point 108 provides direct access to the wider RAN. Each private access point may store a list of one or more access terminals that are authorized to communicate with the particular private access point.

A neighboring home 210 may have its own private access point 212 connected to its DSL or cable modem 214 for use by its owner's access terminal 216. Neighboring private access points may operate independently, in part because real-time communications is difficult between neighboring private access points. Private access points may also operate in a licensed spectrum. Some details and examples of the operation of private access points are discussed in co-pending applications Ser. No. 11/640,501, titled Provisioning Private Access Points for Wireless Networking, filed Dec. 15, 2006 and incorporated here by reference, Ser. No. 11/640,503, titled Configuring Preferred User Zone Lists for Private Access Points for Wireless Networking, filed Dec. 15, 2006 and incorporated here by reference, and Ser. No. 11/735,073, titled Controlling Access to Private Access Points for Wireless Networking, filed Apr. 13, 2007 and incorporated here by reference, and Ser. No. 11/640,415, titled Controlling Reverse Link Interference in Private Access Points for Wireless Networking, filed Dec. 15, 2006 and incorporated here by reference.

As shown in FIG. 2, the private access points 202, 212 may communicate with a network 232, e.g., a remote network or the Internet. Generally, the private access points 202, 212 may communicate with the network 232 via respective backhaul connections 218, 220, e.g., a DSL or cable connections. The network 232 may include one or more remote programmable servers, e.g., servers 226 and 230. A server database, e.g., database 228, may be included within at least one of the programmable servers, e.g., server 230.

In some implementations, for a cost-effective deployment, many private access points in a given metropolitan area may operate on the same uplink/downlink frequency pair, or in one of a defined set of frequency pairs. The private access points may also operate on the same frequency as that of one or more macro access points located in the same metropolitan area. Because many access terminals that are using private access points may transmit at the same frequencies (the pair of uplink/downlink frequencies), the access terminals may interfere with the macro access points or the private access points, or both. Private access points may be configured to mitigate this interference in ways that may not require changes in the macro access points or the access terminals.

By way of example, the access terminal 206, by transmitting signals to the private access point 202 with which the access terminal 206 is authorized to communicate, i.e., by reverse link communications, may interfere with the macro access point 108 or another private access point 212. Reverse link communications include transmissions from an access terminal to an access point. The private access point 202, alone or in combination with, e.g., the programmable server 230, such as a service manager configured to manage a set of private access points (including the private access points 206, 212), may transmit forward link communication messages (see, e.g., signals 302f in FIG. 3) to the access terminal 206 to mitigate the effects of interference caused by the access terminal 206. Forward link communications include transmissions from an access point to an access terminal.

Figure 3:
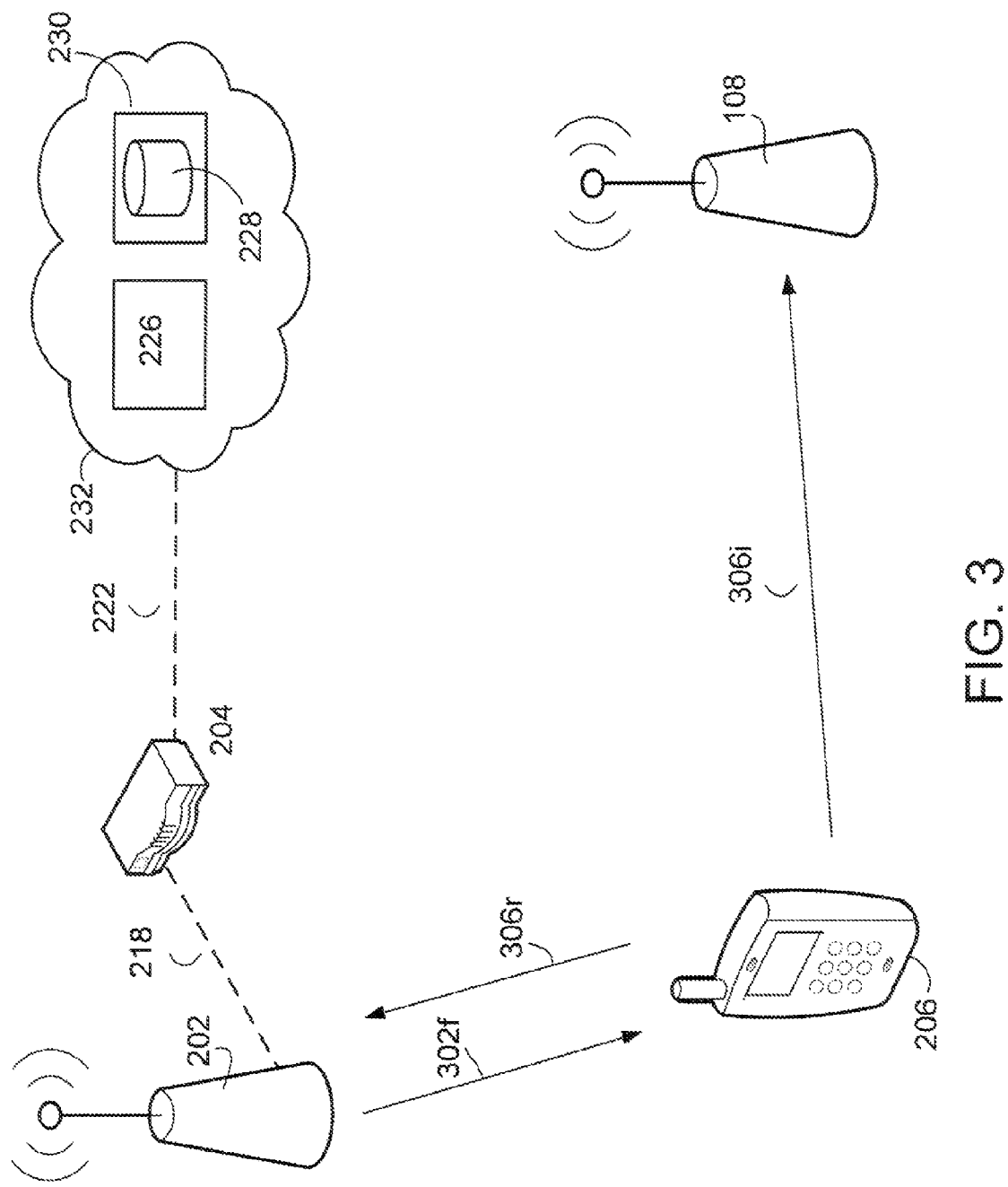
FIG. 3 shows a wireless network.

As shown in FIG. 3, the programmable server 230 may communicate with private access points such as the private access point 202, and the private access point 202 may send messages to the programmable server 230. The access terminal 206 may cause interference 306i to the macro access point 108 when the access terminal 206 communicates (see signals 306r) with the private access point 202. Numerous access terminals communicating with respective private access points may together contribute to and cause interference at a macro access point, such as the macro access point 108. The transmit power of a particular access terminal such as access terminal 206 may be limited or reduced in order to reduce or mitigate interference at the macro access point 108. In EV-DO protocol communication, a private access point, such as the private access point 202, may have no information about the transmit power of an access terminal, such as the access terminal 206. Thus, a private access point may be unable to directly limit the transmit power of an access terminal. The transmit rate of an access terminal, however, is related to the transmit power of the access terminal such that reducing or limiting the transmit rate of the access terminal will, in general, indirectly limit the transmit power of the access terminal.

Therefore, techniques that focus on reducing the transmit rate of an access terminal for reverse link communications may in turn be used to reduce the transmit power and thus reduce the contribution of a particular access terminal to interference at a macro access point. A private access point may enable an access terminal to communicate with the private access point and at the same time may attempt to mitigate interference (caused at least in part by the transmit power of the access terminal) at a macro access point.

The access terminals under discussion are those access terminals that are configured to communicate with a set of private access points. Such access terminals may be referred to as private access point access terminals but for clarity and brevity may simply be referred to as access terminals.

The impact of numerous access terminals communicating with respective private access points on the performance of an existing macro network that includes a macro access point 108 may in general be measured by the level of interference that the numerous access terminals cause at the macro access point 108. A maximum interference limit for the macro access point 108 may be set. The maximum interference limit may be equivalent to the maximum allowable addition to the received power at the macro access point 108 due to the numerous access terminals in the macro network. That is, the maximum interference limit may constrain the contributions to interference at the macro access point 108 due to a set of N access terminals that may cause significant interference, a set that includes the access terminal 206. The maximum interference limit may be denoted by $\Delta P_{I,max}$ and may create an upper bound on the change in interference power at the macro access point as shown in the following inequality:

$$\sum_{i=1}^{N} P_i^{AT} G_i^M \leq \Delta P_{I,max} \tag{1}$$

where $P_i^{AT}$ is the transmit power of the $i^{th}$ access terminal of the set of N access terminals, $G_i^M$ is the path gain from the $i^{th}$ access terminal to the macro access point 108, and $\Delta P_{I,max}$ is the maximum interference limit. The transmit power $P_i^{AT}$ multiplied by the path gain $G_i^M$ gives the received power of the $i^{th}$ access terminal at the macro access point 108; that is, the contribution of the $i^{th}$ access terminal to interference at the macro access point 108. Thus, satisfying the constraint of equation (1) involves keeping the sum of the received power of the access terminals at the macro access point 108 at or below the maximum interference limit.

The private access point 202 (alone or in combination with the programmable server 230) may determine a maximum allowable transmit rate of the access terminal 206 for reverse link communication with the private access point 202. Then, the private access point 202 may cause the access terminal 206 to communicate at a transmit rate at or below the maximum allowable transmit rate.

The private access point 202 (alone or in combination with the programmable server 230) may use the constraint given in equation (1) to estimate the maximum allowable transmit rate for reverse link communications by numerous techniques. One technique is driven by several assumptions, applied to equation (1). One assumption is that each access terminal of the set of N access terminals is permitted to have a limit on its own transmit power, a maximum allowable transmit power $P_{i,max}^{AT}$, that will, in general, be permitted to vary across the set of N access terminals. A second assumption is that the maximum value $P_{i,max}^{AT} G_i^M$ of the received power $P_i^{AT} G_i^M$ of the $i^{th}$ access terminal at the macro access point 108, at any given time, is constant across the set of N access terminals. That is, the each access terminal of the set of N access terminals is assumed to have the same maximum contribution to the interference power at the macro access point 108.

A second technique for estimating the maximum allowable transmit rate for reverse link communications is based on the assumption, applied to equation (1), that the maximum allowable transmit power $P_{max,f}^{AT}$ at any given time, is constant across the set of N access terminals; that is, the set of N access terminals are assumed to have the same transmit power for purposes of equation 1.

Other techniques and variations on the following techniques are possible in other implementations. The following techniques may be dynamically performed, with updated calculations being performed on a continuous basis at certain time intervals.

Access Terminal Specific Transmit Power Limit

The first technique for estimating the maximum allowable transmit rate for reverse link communications by an access terminal applies to equation (1) the assumptions that (a) a maximum allowable transmit power $P_{i,max}^{AT}$ is variable across the set of N access terminals, and that (b) the maximum value $P_{i,max}^{AT} G_i^M$ of the contribution of the $i^{th}$ access terminal to the interference power at the macro access point 108 is constant across the set of N access terminals.

$$\sum_{i=1}^{N} P_i^{AT} G_i^M \leq \Delta P_{I,max} \tag{1}$$

becomes $$P_{i,max}^{AT} G_i^M \sum_{i=1}^{N} 1 = P_{i,max}^{AT} G_i^M N \leq \Delta P_{I,max}; \tag{1a}$$

and, according to the technique, the maximum value $P_{i,max}^{AT} G_i^M$ of the interference contribution of the $i^{th}$ access terminal must satisfy the following constraint:

$$P_{i,max}^{AT} G_i^M \leq \frac{\Delta P_{I,max}}{N} \tag{2}$$

The programmable server 230 may be a private access point service manager that may be configured to manage a set of private access points, including the private access point 202. The programmable server 230 may compute an effective value of the right hand side of equation (2), that is $$\frac{\Delta P_{I,max}}{N},$$

the maximum interference limit $\Delta P_{I,max}$ for the specific macro access point 108 divided by the number of access terminals N. The maximum interference limit $\Delta P_{I,max}$ may be provided by the macro access point 108 or may be otherwise known to the programmable server 230.

In the set of N access terminals, N may represent the number of access terminals that are susceptible to cause substantial interference to a specific macro access point 108, based on, for example, the relative location of access terminals to the macro access point 108. In determining the value N, the programmable server 230 may take in consideration where the set of private access points and the access terminals are located. This may mean, for example, that N represents less than all of the private access point access terminals within a particular macro network. This may also mean that N may vary with time; that is, as updated calculations according to the technique are performed, different numbers N of access terminals may cause substantial interference to the macro access point 108 at different times, and the updated calculations may so reflect. In other implementations, N may represent all of the private access point access terminals within a particular macro network that includes the macro access point 108. Various values and definitions for the number of access terminals N in equation (2) are possible.

The programmable server 230, such as a service manager configured to manage the set of private access points, may provide an effective value or estimate $$\frac{\Delta P_{I,max}}{N}$$

to each private access point, such as the private access point 202. The programmable server 230 may arrive at the value $PG_{max,i}$ by taking into consideration other macro access points in addition to the specific macro access point 108, that may be located near a particular private access point, so that the estimated value $PG_{max,i}$ does not lead to a calculated access terminal transmit rate or rate limit that impacts the other macro access points. That is, the programmable server 230 may not determine its estimate $$\frac{\Delta P_{I,max}}{N}$$

by considering the impact of interference on the macro access point 108 in isolation from other macro access points in the vicinity that may be impacted by access terminal interference.

The private access point 202 may determine the maximum allowable transmit rate of the access terminal 206 according to the following technique by using values measured or computed at the private access point 202 along with values provided by the programmable server 230 (e.g., the value $PG_{max,i}$) and by the access terminal 206. For ease of discussion, the $i^{th}$ access terminal of the set of N access terminals is referred to as access terminal 206.

According to the technique, the private access point 202 receives a macro access point signal strength value and a private access point signal strength value from the access terminal 206, which may measure each signal strength value. The macro access point signal strength value may be a pilot signal strength ratio $$(P^M G_i^M)/I_0^{AT}$$

of the macro access point 108 that represents the proportion of the total received power measured by the access terminal 206 that is due to the received pilot signal power of the macro access point 108 at the access terminal 206, where:

$I_0^{AT}$ represents the total received power measured by the access terminal 206;

$G_i^M$ represents the gain from the macro access point 108 to the access terminal 206; and $P^M$ represents the transmit power of the macro access point 108, so that the product $P^M G_i^M$ represents the received pilot signal power of the macro access point 108 at the access terminal 206.

The private access point signal strength value may be a pilot signal strength ratio $$(P^F G_i^F)/I_0^{AT}$$

of the private access point 202 that represents the proportion of the total received power measured by the access terminal 206 that is due to the received pilot signal power of the private access point 202 at the access terminal 206, where:

as before, $I_0^{AT}$ represents the total received power measured by the access terminal 206;

$G_i^F$ represents the gain from the private access point 202 to the access terminal 206; and $P^F$ represents the transmit power of the private access point 202, so that the product $P^F G_i^F$ represents the received pilot signal power of the private access point 202 at the access terminal 206.

The transmit power $P^F$ of the private access point 202 is known to the private access point 202. The transmit power $P^M$ of the macro access point 108 may also be known to the private access point 202, since the macro access point 108 may transmit at a known power that may be sent to the programmable server 230 and eventually the private access point 202. From these received and known values, the private access point 202 may determine the ratio $$G_i^M / G_i^F$$

for the access terminal 206 in the following manner:

$$\frac{G_i^M}{G_i^F} = \left(\frac{(P^M G^M)/I_0^{AT}}{(P^F G^F)/I_0^{AT}}\right) \times \left(\frac{P^F}{P^M}\right) \quad (3)$$

The private access point 202 may measure a received pilot signal power $M_i$ from the access terminal 206 at the private access point 202, where:

$$M_i = (P_{i,pilot}^{AT} G_i^F) \quad (4)$$

and, as before, $G_i^F$ represents the gain from the access terminal 206 to the private access point 202, which is assumed to be equivalent to the gain from the private access point 202 to the access terminal 206; and $P_{i,pilot}^{AT}$ is the pilot signal power of access terminal 206.

The private access point 202 may then determine the received pilot signal power $P^M G_i^M$ of the access terminal 206 at the macro access point 108, according to the following relationship and by using equation (4) for $M_i$:

$$(P_{i,pilot}^{AT} G_i^M) = (P_{i,pilot}^{AT} G_i^F) \times \left(\frac{G_i^M}{G_i^F}\right) = M_i \times \left(\frac{G_i^M}{G_i^F}\right) \quad (5)$$

An access terminal such as access terminal 206 may transmit a signal that includes a pilot signal channel, other control channels having a corresponding power that is linked to the pilot signal power, and the data channel. In an implementation, the data channel transmit power is equal to the pilot signal multiplied by a function $D(R_i)$ that will in general depend on a data channel transmit rate $R_i$ of the access terminal and on the type of traffic being transmitted (for example, voice or data). The function $D(R_i)$ is a known mathematical function of the data channel transmit rate $R_i$ and is more well known in the EV-DO standard as the T2P ratio, or "Traffic to Pilot" ratio. That is, the T2P ratio is the ratio of the data channel transmit power to the pilot signal transmit power $P_{i,pilot}^{AT}$. The transmit power $P_i^{AT}$ may be given by the following relationship:

$$P_i^{AT} = P_{i,pilot}^{AT} \times T(R_i) \quad (6)$$

where $T(R_i)$ is also a known mathematical function of the data channel transmit rate $R_i$. $T(R_i)$ may take into account the transmit powers of the pilot signal channel, the control channels, and the data channel.

Multiplying both sides of equation (6) by the gain $G_i^M$ from the macro access point 108 to the access terminal 206, and then using equation (5) and applying the constraint in equation (2), yields the following relationship:

$$P_i^{AT} G_i^M = T(R_i)(P_{i,pilot}^{AT} G_i^M) = T(R_i)\left(M_i \times \frac{G_i^M}{G_i^F}\right) \le PG_{max,i} \quad (7)$$

and solving for the function $T(R_i)$ gives the following equation:

$$T(R_i) \le \frac{PG_{max,i}}{\left(M_i \times \frac{G_i^M}{G_i^F}\right)} \quad (8)$$

In an implementation, the private access point 202, having received the value $PG_{max,i}$ from the programmable server 202, having measured the received pilot signal power $M_i$ from the access terminal 206 at the private access point 202, and having determined the ratio $$G_i^M / G_i^F$$

for the access terminal 206 based in part on inputs provided from the access terminal 206 (see equation (3)), may next estimate the maximum allowable (data channel) transmit rate of $R_{i,max}$ by applying an inverse function to the constraint in equation (8). In an implementation, the inverse function $T^{-1}(x)$ denotes the inverse of the mathematical function $T(R_i)$ so that $T^{-1}(x)$ returns the transmit rate $R_i$ that can be supported for a given $$x = \frac{P_i^{AT}}{P_{i,pilot}^{AT}}.$$

Therefore, applying the inverse function $T^{-1}(x)$ to the constraint in equation (8) yields the maximum allowable transmit rate $R_{i,max}$ for the access terminal 206:

$$R_{i,max} \le T^{-1}\left[\frac{PG_{max,i}}{\left(M_i \times \frac{G_i^M}{G_i^F}\right)}\right] \quad (9)$$

After the private access point 202 (alone or in combination with the programmable server 230) has determined, according to the first technique, a maximum allowable transmit rate $R_{i,max}$ of the access terminal 206 for reverse link communication with the private access point 202, the private access point 202 may then cause the access terminal 206 to communicate at a transmit rate at or below the maximum allowable transmit rate.

Common Access Terminal Transmit Power Limit

The second technique for estimating the maximum allowable transmit rate for reverse link communications by an access terminal applies to equation (1) the assumption that the maximum allowable transmit power $P_{max,f}^{AT}$, at any given time, is constant across the set of N access terminals; that is, the set of N access terminals are assumed to have the same transmit power for purposes of equation 1.

$$\sum_{i=1}^{N} P_i^{AT} G_i^M \le \Delta P_{I,max} \quad (1)$$

becomes $$P_{max,f}^{AT} \sum_{i=1}^{N} G_i^M \le \Delta P_{I,max}; \quad (10)$$

and, according to the technique, the maximum allowable transmit power $P_{max,f}^{AT}$ is given by the following constraint:

$$P_{max,f}^{AT} \le \frac{\Delta P_{I,max}}{\sum_{i=1}^{N} G_i^M} \quad (11)$$

where $G_i^M$ is the path gain from the $i^{th}$ access terminal to the macro access point 108, and $\Delta P_{I,max}$ is the maximum interference limit.

According to the technique, the transmit power $P_i^{AT}$ of the $i^{th}$ access terminal of the set of N access terminals cannot exceed the maximum allowable transmit power $P_{max,f}^{AT}$.

The programmable server 230 may be a private access point service manager that may be configured to manage a set of private access points, including the private access point 202. The programmable server 230 may compute an effective value of the right hand side of equation (11), that is $$\frac{\Delta P_{I,max}}{\sum_{i=1}^{N} G_i^M},$$

the maximum interface limit $\Delta P_{I,max}$ for the specific macro access point 108 divided by the sum of the path gain $G_i^M$ from each $i^{th}$ access terminal of N access terminals to the macro access point 108. As described above with respect to the first technique, various values and definitions for the number of access terminals N are possible. The maximum interference limit $\Delta P_{I,max}$ may be provided by the macro access point 108 or may be otherwise known to the programmable server 230.

In general, the programmable server 230 may not know the path gain $G_i^M$ for each $i^{th}$ access terminal and may receive the path gain value $G_i^M$ for the $i^{th}$ access terminal (e.g., access terminal 206) from the private access point (e.g., private access point 202) communicating with the $i^{th}$ access terminal. For ease of discussion, the $i^{th}$ access terminal of the set of N access terminals is referred to as access terminal 206.

According to the technique, the private access point 202 receives a macro access point signal strength value from the access terminal 206, which may measure the macro access point signal strength value. The macro access point signal strength value may be a pilot signal strength ratio $$(P^M G_i^M)/I_0^{AT}$$

of the macro access point 108 that represents the proportion of the total received power measured by the access terminal 206 that is due to the received pilot signal power of the macro access point 108 at the access terminal 206, where:

$I_0^{AT}$ represents the total received power measured by the access terminal 206;

$G_i^M$ represents the gain from the macro access point 108 to the access terminal 206; and $P^M$ represents the transmit power of the macro access point 108, so that the product $P^M G_i^M$ represents the received pilot signal power of the macro access point 108 at the access terminal 206.

The transmit power $P^M$ of the macro access point 108 may be known to the private access point 202, since the macro access point 108 may transmit at a known power that may be sent to the programmable server 230 and eventually the private access point 202. The access terminal 206 may not report the total power $I_0^{AT}$ measured by the access terminal 206 to the private access point 202. Thus, in order to determine a value for $G_i^M$, the private access point 202 may need to estimate $G_i^M$ using the values known to the private access point 202 along with an estimate $\hat{I}_0^{AT}$ of the value $I_0^{AT}$. From these received, known, and estimated values, the private access point 202 may estimate $G_i^M$ for the access terminal 206 in the following manner:

$$G_i^M \cong \left(\frac{(P^M G_i^M)}{I_0^{AT}}\right) \times \left(\frac{1}{P^M}\right) \times \left(\hat{I}_0^{AT}\right) \quad (12)$$

To estimate $\hat{I}_0^{AT}$ the private access point 202 may first measure $I_0^F$; that is, the total received power at the private access point 202 at a frequency used by the macro access point 108. A receiver on the private access point 202 may periodically switch to the frequency used by the macro access point 108 from a frequency that the private access point 202 normally may use to receive signals from an access terminal such as access terminal 206. In this way, the private access point 202 may, from time to time, "sniff," for example, the total received power at the private access point 202 at the macro access point 108 frequency.

The private access point may estimate $\hat{I}_0^{AT}$ using statistical techniques based on, for example, observations of a relationship between $I_0^{AT}$ and $I_0^F$. While $I_0^{AT}$ and $I_0^F$ are generally linked, a statistical relationship between $I_0^{AT}$ and $I_0^F$ may be imprecise and, in an implementation, may as such be periodically determined and updated based on, e.g., analysis of historical data and the like.

The estimated value of $G_i^M$ computed by the private access point 202 using the equation (12) may be forwarded to the programmable server 230. The programmable server 230, such as a service manager configured to manage the set of private access points, may compute an effective value of the right hand side of equation (11), that is $$\frac{\Delta P_{I,max}}{\sum_{i=1}^{N} G_i^M}$$

using $G_i^M$ estimates provided by the set of private access points. The programmable server 230 may provide the effective value or estimate $P_{max}^{AT}$ here a constant for the set of private access points, to each private access point, such as the private access point 202. The programmable server 230 may arrive at the value $P_{max}^{AT}$ by taking into consideration other macro access points in addition to the specific macro access point 108, that may be located near a particular private access point, so that the estimated value $P_{max}^{AT}$ does not lead to a calculated access terminal transmit rate or rate limit that impacts the other macro access points. That is, the programmable server 230 may not determine its estimate $$P_{max}^{AT} \text{ of } \frac{\Delta P_{I,max}}{\sum_{i=1}^{N} G_i^M}$$

by considering the impact of interference on the macro access point 108 in isolation from other macro access points in the vicinity that may be impacted by access terminal interference. As such, the estimate $P_{max}^{AT}$ may vary for each private access point and the value of the estimate applicable to the $i^{th}$ access terminal may be denoted as $P^{max,iAT}$. The estimate $P_{max,i}^{AT}$ may vary for each access terminal i. In an implementation, the estimate $P^{max,iAT}$ may vary for each particular private access point, but be may be constant for the one or more access terminals communicating with the particular private access point.

The private access point 202 may determine that maximum allowable transmit rate of the access terminal 206 according to the following technique by using values measured or computed at the private access point 202 along with values provided by the programmable server 230 (e.g., the value $P_{max,i}^{AT}$) and by the access terminal 206. Again, for ease of discussion, the $i^{th}$ access terminal of the set of N access terminals is referred to as access terminal 206.

According to the technique, the private access point 202 receives a private access point signal strength value from the access terminal 206, which may measure the macro access point signal strength value. The private access point signal strength value may be a pilot signal strength ratio $$(P^F G_i^F)/I_0^{AT}$$

of the private access point 202 that represents the proportion of the total received power measured by the access terminal 206 that is due to the received pilot signal power of the private access point 202 at the access terminal 206, where:
as before, $I_0^{AT}$ represents the total received power measured by the access terminal 206;
$G_i^F$ represents the gain from the private access point 202 to the access terminal 206; and
$P^F$ represents the transmit power of the private access point 202, so that the product
$P^F G_i^F$ represents the received pilot signal power of the private access point 202 at the access terminal 206.

The transmit power $P^F$ of the private access point 202 is known to the private access point 202. From these received and known values, the private access point 202 may determine the ratio $$G_i^M / G_i^F$$

for the access terminal 206 in the following manner:

As described above, the access terminal 206 may not report the total power $I_0^{AT}$ measured by the access terminal 206 to the private access point 202. Thus, in order to determine a value for $G_i^F$, the private access point 202 may need to estimate $G_i^F$ using the values known to the private access point 202 along with an estimate $\hat{I}_0^{AT}$ of the value $I_0^{AT}$ as described above. From these received, known, and estimated values, the private access point 202 may estimate $G_i^F$ for the access terminal 206 in the following manner:

$$G_i^F \cong \left(\frac{(P^F G_i^F)}{I_0^{AT}}\right) \times \left(\frac{1}{P^F}\right) \times (\hat{I}_0^{AT}) \qquad (13)$$

The private access point 202 may measure a received pilot signal power $M_i$ from the access terminal 206 at the private access point 202, where:

$$M_i = (P_{i,pilot}^{AT} G_i^F) \text{tm} \quad (4)$$

and, as before,
$G_i^F$ represents the gain from the access terminal 206 to the private access point 202, which is assumed to be equivalent to the gain from the private access point 202 to the access terminal 206; and
$P_{i,pilot}^{AT}$ is the pilot signal power of access terminal 206.
Solving for $P_{i,pilot}^{AT}$ yields the following equation:

$$P_{i,pilot}^{AT} = \frac{M_i}{G_i^F} \qquad (14)$$

As described above with regard to the first technique, the transmit power $P_i^{AT}$ may be given by the following relationship:

$$P_i^{AT} = P_{i,pilot}^{AT} \times T(R_i) \qquad (6)$$

where the function $T(R_i)$ is a known mathematical function of the data channel transmit rate $R_i$.

Using equation (14) and applying the constraint in equation (11), yields the following relationship:

$$P_i^{AT} = T(R_i)(P_{i,pilot}^{AT}) = T(R_i)\left(M_i \times \frac{1}{G_i^F}\right) \leq P_{max,i}^{At} \qquad (15)$$

and solving for the function $T(R_i)$ gives the following equation:

$$T(R_i) \leq \left(\frac{P_{max,i}^{AT}}{P_{i,pilot}^{AT}}\right) = \left(P_{max,i}^{AT} \times \frac{G_i^F}{M_i}\right) \qquad (16)$$

In an implementation, the private access point 202, having estimated the path gain $G_i^M$ (see equation (12)) and having provided the estimated value $G_i^M$ to the programmable server 202, having received the estimate $$P_{max,i}^{AT} \text{ of } \frac{\Delta P_{I,max}}{\sum_{i=1}^{N} G_i^M}$$

from the programmable server 202, having measured the received pilot signal power $M_i$ from the access terminal 206 at the private access point 202, and having estimated the path gain $G_i^F$ (see equation (13)), may next estimate the maximum allowable (data channel) transmit rate of $R_{i,max}$ by applying an inverse function to the constraint in equation (16). In an implementation, the inverse function $T^{-1}(x)$ denotes the inverse of the mathematical function $T(R_i)$ so that $T^{-1}(x)$ returns the transmit rate $R_i$ that can be supported for a given $$x = \frac{P_i^{AT}}{P_{i,pilot}^{AT}}.$$

Therefore, applying the inverse function $T^{-1}(x)$ to the constraint in equation (17) yields the maximum allowable transmit rate $R_{i,max}$ for the access terminal 206:

$$R_{i,max} \leq T^{-1}\left(\frac{P_{max,i}^{AT}}{P_{i,pilot}^{AT}}\right) = T^{-1}\left(P_{max,i}^{AT} \times \frac{G_i^F}{M_i}\right) \qquad (17)$$

After the private access point 202 (alone or in combination with the programmable server 230) has determined, according to the second technique, a maximum allowable transmit rate $R_{i,max}$ of the access terminal 206 for reverse link communication with the private access point 202, the private access point 202 may then cause the access terminal 206 to communicate at a transmit rate at or below the maximum allowable transmit rate.

These techniques can also be used to mitigate interference between an access terminal, such as the access terminal 206 of FIG. 2, and a private access point, such as the private access point 212. For example, the access terminal 206, when communicating with the private access point 202, may cause interference at the private access point 212 if the private access point is operating on the same frequency. The interference reduction techniques discussed herein may be applied with few modifications to reduce interference at a private access point 212 by replacing the macro access point 108 with the private access point 212 in the description of these techniques.

Depending on the particular revision of the EV-DO air interface standard, existing commands from the standard may be used by a private access point to limit the transmit rate of a particular access terminal for reverse link communications and in turn to reduce the transmit power of the access terminal and thus reduce the contribution of the particular access terminal to interference at a macro access point. Revision 0 of the EV-DO air interface standard includes a UnicastReverseRateLimit command message. A private access point such as the private access point 202 may use the UnicastReverseRateLim it command message to limit the maximum transmit rate of an access terminal such as the access terminal 206. That is, the private access point 202 may send a UnicastReverseRateLimit command message to the access terminal 206 to cause the access terminal to communicate at a desired transmit rate.

In Revision A and Revision B of the EV-DO air interface standard, the PermittedPayload attribute may be used by a private access point such as private access point 202 to limit the maximum transmit rate of an access terminal such as the access terminal 206. The PermittedPayload attribute, while designed to prevent a rapid increase in packet-size of transmitted packets, may be used to limit the maximum transmit rate, and thus the transmit power, of the access terminal 206. That is, setting the PermittedPayload attribute on the access terminal may affect the maximum packet size of packets transmitted by the access terminal and thus the transmit rate the access terminal, which in turn affects the transmit power. The PermittedPayload attribute may be set on the fly by the private access point 202 using a GAUP (General Attribute Update Protocol) procedure.

Although the techniques described above employ the EV-DO air interface standard, the techniques may be applicable to other air interface technologies in which, for example, access terminals contribute to interference at a macro access point or other access points.

The processes described herein are not limited to use with any particular hardware, software, or programming language; they may find applicability in any computing or processing environment and with any type of machine that is capable of running machine-readable instructions. All or part of the processes can be implemented in digital electronic circuitry, or in computer hardware, firmware, software, or in combinations thereof.

All or part of the processes can be implemented as a computer program product, e.g., a computer program tangibly embodied in one or more information carriers, e.g., in one or more machine-readable storage media or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Actions associated with the processes can be performed by one or more programmable processors executing one or more computer programs to perform the functions of the processes. The actions can also be performed by, and the processes can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, one or more processors will receive instructions and data from a read-only memory or a random access memory or both. The essential elements of a computer are one or more processors for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Actions associated with the processes can be rearranged and/or one or more such actions can be omitted to achieve the same, or similar, results to those described herein.

Elements of different implementations may be combined to form implementations not specifically described herein.

In using the term "may," it is understood to mean "could, but not necessarily must."

Numerous uses of and departures from the specific system and processes disclosed herein may be made without departing from the inventive concepts. Consequently, the invention is to be construed as embracing each and every novel feature and novel combination of features disclosed herein and limited only by the spirit and scope of the appended claims.

What is claimed is:

1. A method of enabling an access terminal in a set of access terminals in a network to communicate with a private access point in the network, the method comprising:
   determining a first transmit rate of the access terminal for communication with the private access point; and
   causing the access terminal to communicate at a second transmit rate at or below the first transmit rate;
   wherein the first transmit rate is constrained in accordance with $$\sum_{i=1}^{N} P_i^{AT} G_i^M \leq \Delta P_I;$$

wherein AT comprises an $i^{th}$ access terminal of the set of access terminals;
   wherein $P_i^{AT}$ comprises a transmit power of the $i^{th}$ access terminal of the set of access terminals;
   wherein N comprises the set of access terminals;
   wherein $G_i^M$ comprises a path gain from the $i^{th}$ access terminal to a macro access point in the network; and
   wherein $\Delta P_I$ comprises an interference limit for the private access point.

2. The method of claim 1, wherein actions of determining and causing mitigate interference at the macro access point.

3. The method of claim 1, wherein the private access point comprises a first private access point; and
   wherein actions of determining and causing mitigate interference at a second private access point in the network.

4. The method of claim 1, wherein contributions to interference at the macro access point due to the set of access terminals are constrained by the interference limit for the macro access point.

5. The method of claim 1, wherein the first transmit rate comprises a maximum allowable transmit rate; and
   wherein the interference limit comprises a maximum interference limit.

6. The method of claim 1, wherein determining the first transmit rate comprises:
   receiving a value $PG_i$;
   wherein $PG_i$ comprises an estimate of the interference limit divided by a number of access terminals of the set of access terminals.

7. The method of claim 1, wherein the transmit power comprises a first transmit power, and wherein determining the first transmit rate comprises:
   estimating the path gain $G_i^M$ from the $i^{th}$ access terminal to the macro access point; and
   receiving a value indicative of a second transmit power;
   wherein the second transmit power is based in part on the path gain $G_i^M$ and the interference limit.

8. The method of claim 1, wherein determining the first transmit rate comprises:
   determining a power value, the power value being a value indicative of an amount of power received from the access terminal at the macro access point; and
   estimating the first transmit rate based in part on the power value and on the interference limit.

9. The method of claim 8, wherein the power values comprises a first power value, and wherein determining the first power value comprises:
   receiving a macro access point signal strength value and a private access point signal strength value from the access terminal;
   determining a second power value, the second power value being a value indicative of an amount of power received from the access terminal at the private access point; and
   determining the first power value based on the macro access point signal strength value, the private access point signal strength value, a private access point transmit power value, a macro access point transmit power value, and the second power value.

10. The method of claim 1, wherein determining the first transmit rate comprises:
    receiving an estimated transmit power of the access terminal; and
    estimating the first transmit rate based on the estimated transmit power.

11. The method of claim 10, wherein estimating the first transmit rate based on the estimated transmit power comprises:
    estimating the first transmit rate according to the following equation:

$$R_i = T^{-1}\left(\frac{P'^{AT}_i}{P^{AT}_{i,pilot}}\right);$$

wherein $R_i$ comprises the first transmit rate;
   wherein $T^{-1}(x)$ comprises an inverse of a mathematical function $T(R)$ of a transmit rate R of the $i^{th}$ access terminal;
   wherein $P'^{AT}_i$ comprises the estimated transmit power; and
   wherein $P^{AT}_{i,pilot}$ comprises a pilot signal power of the $i^{th}$ access terminal; and
   wherein the estimated transmit power is constant for all access terminals of the set of access terminals.

12. The method of claim 11, further comprising:
    estimating the path gain $G_i^M$ from the $i^{th}$ access terminal to the macro access point; and
    sending the path gain $G_i^M$ to a programmable server;
    wherein the programmable server is configured to manage the private access point.

13. The method of claim 12, wherein the programmable server is configured to determine the estimated transmit power based in part on the path gain $G_i^M$ and the interference limit for the macro access point.

14. The method of claim 12, wherein the path gain $G_i^M$ comprises a first path gain $G_i^M$, and wherein the method further comprises:
    estimating a second path gain $G_i^F$ from the $i^{th}$ access terminal to the private access point; and
    estimating a total power value $\hat{I}_O^{AT}$ indicative of a total power measured by the access terminal;
    wherein the first path gain $G_i^M$ and the second path gain $G_i^F$ are based in part on the total power value $\hat{I}_O^{AT}$.

15. The method of claim 1, wherein causing the access terminal to communicate at the second transmit rate comprises:
    setting an attribute on the access terminal to affect a packet size of packets transmitted by the access terminal.

16. The method of claim 1, wherein causing the access terminal to communicate at second transmit rate comprises:

sending a message to the access terminal instructing the access terminal to communicate at the second transmit rate.

17. One or more machine-readable storage media configured to store instructions that are executable by one or more processing devices to perform operations comprising:
determining a first transmit rate of an access terminal in a set of access terminals in a network for communication with a private access point in the network; and
causing the access terminal to communicate at a second transmit rate at or below the first transmit rate;
wherein the first transmit rate is constrained in accordance with $$\sum_{i=1}^{N} P_i^{AT} G_i^M \leq \Delta P_I;$$

wherein AT comprises an $i^{th}$ access terminal of the set of access terminals;
wherein $P_i^{AT}$ comprises a transmit power of an $i^{th}$ access terminal of the set of access terminals;
wherein N comprises the set of access terminals;
wherein $G_i^M$ comprises a path gain from the $i^{th}$ access terminal to a macro access point in the network; and
wherein $\Delta P_I$ comprises an interference limit for the private access point.

18. The one or more machine-readable storage media of claim 17, wherein the operations mitigate interference at the macro access point.

19. The one or more machine-readable storage media of claim 17, wherein the private access point comprises a first private access point; and
wherein the operations mitigate interference at a second private access point in the network.

20. The one or more machine-readable storage media of claim 17, wherein contributions to interference at the macro access point due to the set of access terminals are constrained by the interference limit for the macro access point.

21. The one or more machine-readable storage media of claim 17, wherein the first transmit rate comprises a maximum allowable transmit rate; and
wherein the interference limit comprises a maximum interference limit.

22. The one or more machine-readable storage media of claim 17, wherein determining the first transmit rate comprises:
receiving a value $PG_i$;
wherein $PG_i$ comprises an estimate of the interference limit divided by a number of access terminals of the set of access terminals.

23. The one or more machine-readable storage media of claim 17, wherein the transmit power comprises a first transmit power, and wherein determining the first transmit rate comprises:
estimating the path gain $G_i^M$ from the $i^{th}$ access terminal to the macro access point; and
receiving a value indicative of a second transmit power;
wherein the second transmit power is based in part on the path gain $G_i^M$ and the interference limit.

24. The one or more machine-readable storage media of claim 17, wherein determining the first transmit rate comprises:
determining a power value, the power value being a value indicative of an amount of power received from the access terminal at the macro access point; and
estimating the first transmit rate based in part on the power value and on the interference limit.

25. The one or more machine-readable storage media of claim 24, wherein the power values comprises a first power value, and wherein determining the first power value comprises:
receiving a macro access point signal strength value and a private access point signal strength value from the access terminal;
determining a second power value, the second power value being a value indicative of an amount of power received from the access terminal at the private access point; and
determining the first power value based on the macro access point signal strength value, the private access point signal strength value, a private access point transmit power value, a macro access point transmit power value, and the second power value.

26. The one or more machine-readable storage media of claim 17, wherein determining the first transmit rate comprises:
receiving an estimated transmit power of the access terminal; and
estimating the first transmit rate based on the transmit power.

27. The one or more machine-readable storage media of claim 26, wherein estimating the first transmit rate based on the estimated transmit power comprises:
estimating the first transmit rate according to the following equation:

$$R_i = T^{-1}\left(\frac{P'^{AT}_i}{P^{AT}_{i,pilot}}\right);$$

wherein $R_i$ comprises the first transmit rate;
wherein $T^{-1}(x)$ comprises an inverse of a mathematical function $T(R)$ of a transmit rate R of the $i^{th}$ access terminal;
wherein $P'^{AT}_i$ comprises the estimated transmit power; and
wherein $P^{AT}_{i,pilot}$ comprises a pilot signal power of the $i^{th}$ access terminal; and
wherein the estimated transmit power is constant for all access terminals of the set of access terminals.

28. The one or more machine-readable storage media of claim 27, wherein the operations further comprise:
estimating the path gain $G_i^M$ from the $i^{th}$ access terminal to the macro access point; and
sending the path gain $G_i^M$ to a programmable server;
wherein the programmable server is configured to manage the private access point.

29. The one or more machine-readable storage media of claim 28, wherein the programmable server is configured to determine the estimated transmit power based in part on the path gain $G_i^M$ and the interference limit for the macro access point.

30. The one or more machine-readable storage media of claim 28, wherein the path gain $G_i^M$ comprises a first path gain $G_i^M$, and wherein the operations further comprise:
estimating a second path gain $G_i^F$ from the $i^{th}$ access terminal to the private access point; and
estimating a total power value $\hat{I}_O^{AT}$ indicative of a total power measured by the access terminal;
wherein the first path gain $G_i^M$ and the second path gain $G_i^F$ are based in part on the total power value $\hat{I}_O^{AT}$.

31. The one or more machine-readable storage media of claim 17, wherein causing the access terminal to communicate at the second transmit rate comprises:
setting an attribute on the access terminal to affect a packet size of packets transmitted by the access terminal.

32. The one or more machine-readable storage media of claim 17, wherein causing the access terminal to communicate at the second transmit rate comprises:
sending a message to the access terminal instructing the access terminal to communicate at the second transmit rate.

33. A system comprising:
one or more processing devices; and
one or more machine-readable storage media configured to store instructions that are executable by the one or more processing devices to perform operations comprising:
determining a first transmit rate of an access terminal in a set of access terminals in a network for communication with a private access point in the network; and
causing the access terminal to communicate at a second transmit rate at or below the first transmit rate;
wherein the first transmit rate is constrained in accordance with $$\sum_{i=1}^{N} P_i^{AT} G_i^M \leq \Delta P_I;$$

wherein AT comprises an $i^{th}$ access terminal of the set of access terminals;
wherein $P_i^{AT}$ comprises a transmit power of an $i^{th}$ access terminal of the set of access terminals;
wherein N comprises the set of access terminals;
wherein $G_i^M$ comprises a path gain from the $i^{th}$ access terminal to a macro access point in the network; and
wherein $\Delta AP_I$ comprises an interference limit for the private access point.

34. The system of claim 33, wherein the operations mitigate interference at the macro access point.

35. The system of claim 33, wherein the private access point comprises a first private access point; and
wherein the operations mitigate interference at a second private access point in the network.

36. The system of claim 33, wherein contributions to interference at the macro access point due to the set of access terminals are constrained by the interference limit for the macro access point.

37. The system of claim 33, wherein the first transmit rate comprises a maximum allowable transmit rate; and
wherein the interference limit comprises a maximum interference limit.

38. The system of claim 37, wherein determining the first transmit rate comprises:
receiving a value $PG_i$;
wherein $PG_i$ comprises an estimate of the interference limit divided by a number of access terminals of the set of access terminals.

39. The system of claim 37, wherein the transmit power comprises a first transmit power, and wherein determining the first transmit rate comprises:
estimating the path gain $G_i^M$ from the $i^{th}$ access terminal to the macro access point; and
receiving a value indicative of a second transmit power;
wherein the second transmit power is based in part on the path gain $G_i^M$ and the interference limit.

40. The system of claim 33, wherein determining the first transmit rate comprises:
determining a power value, the power value being a value indicative of an amount of power received from the access terminal at the macro access point; and
estimating the first transmit rate based in part on the power value and on the interference limit.

41. The system of claim 40, wherein the power values comprises a first power value, and wherein determining the first power value comprises:
receiving a macro access point signal strength value and a private access point signal strength value from the access terminal;
determining a second power value, the second power value being a value indicative of an amount of power received from the access terminal at the private access point; and
determining the first power value based on the macro access point signal strength value, the private access point signal strength value, a private access point transmit power value, a macro access point transmit power value, and the second power value.

42. The system of claim 33, wherein determining the first transmit rate comprises:
receiving an estimated transmit power of the access terminal; and
estimating the first transmit rate based on the transmit power.

43. The system of claim 42, wherein estimating the first transmit rate based on the estimated transmit power comprises:
estimating the first transmit rate according to the following equation:

$$R_i = T^{-1}\left(\frac{P'^{AT}_i}{P^{AT}_{i,pilot}}\right);$$

wherein $R_i$ comprises the first transmit rate;
wherein $T^{-1}(x)$ comprises an inverse of a mathematical function $T(R)$ of a transmit rate R of the $i^{th}$ access terminal;
wherein $P'^{AT}_i$ comprises the estimated transmit power; and
wherein $P^{AT}_{i,pilot}$ comprises a pilot signal power of the $i^{th}$ access terminal; and
wherein the estimated transmit power is constant for all access terminals of the set of access terminals.

44. The system of claim 43, wherein the operations further comprise:
estimating the path gain $G_i^M$ from the $i^{th}$ access terminal to the macro access point; and
sending the path gain $G_i^M$ to a programmable server.

45. The system of claim 44, wherein the a programmable server is configured to:
determine the estimated transmit power based in part on the path gain $G_i^M$ and the interference limit for the macro access point.

46. The system of claim 44, wherein the path gain $G_i^M$ comprises a first path gain $G_i^M$, and wherein the operations further comprise:
estimating a second path gain $G_i^F$ from the $i^{th}$ access terminal to the private access point; and
estimating a total power value $\hat{I}_O^{AT}$ indicative of a total power measured by the access terminal;

wherein the first path gain $G_i^M$ and the second path gain $G_i^F$ are based in part on the total power value $\hat{I}_O^{AT}$.

47. The system of claim 33, wherein causing the access terminal to communicate at the second transmit rate comprises:

setting an attribute on the access terminal to affect a packet size of packets transmitted by the access terminal.

48. The system of claim 33, wherein causing the access terminal to communicate at the second transmit rate comprises:

sending a message to the access terminal instructing the access terminal to communicate at the second transmit rate.

* * * * *

UNITED STATES PATENT AND TRADEMARK OFFICE
CERTIFICATE OF CORRECTION

PATENT NO. : 8,165,528 B2
APPLICATION NO. : 11/965070
DATED : April 24, 2012
INVENTOR(S) : Balaji Raghothaman It is certified that error appears in the above-identified patent and that said Letters Patent is hereby corrected as shown below:

Column 22, Line 38, In Claim 11, delete "$P_{i,pilot}{}^{AT}$" and insert -- $P^{AT}_{i,pilot}$ -- therefor.

Column 22, Line 67, In Claim 16, after "at" insert -- the --.

Column 25, Line 38, In Claim 33, delete "$\Delta\ AP_I$" and insert -- $\Delta\ P_I$ -- therefor.

Column 26, Line 55 (approx.), In Claim 45, after "the" delete "a".

Signed and Sealed this
Third Day of July, 2012

David J. Kappos
*Director of the United States Patent and Trademark Office*